United States Patent
Pozhenko et al.

(10) Patent No.: US 7,782,779 B2
(45) Date of Patent: Aug. 24, 2010

(54) APPARATUS AND METHOD FOR TRANSMITTING A MULTIMEDIA DATA STREAM

(75) Inventors: Mikhail Pozhenko, Suwon-si (KR); Sang-bum Suh, Seoul (KR); Sung-kwan Heo, Seoul (KR); Jae-wook Lee, Seoul (KR)

(73) Assignee: Samsung Electronics Company, Ltd., Suwon-si (KR)

(*) Notice: Subject to any disclaimer, the term of this patent is extended or adjusted under 35 U.S.C. 154(b) by 848 days.

(21) Appl. No.: 11/417,238

(22) Filed: May 4, 2006

(65) Prior Publication Data
US 2007/0019551 A1 Jan. 25, 2007

(30) Foreign Application Priority Data
May 4, 2005 (KR) ............... 10-2005-0037624

(51) Int. Cl.
G01R 31/08 (2006.01)
G06F 11/00 (2006.01)
G08C 15/00 (2006.01)
H04J 1/16 (2006.01)
H04J 3/14 (2006.01)
H04L 1/00 (2006.01)
H04L 12/26 (2006.01)
H04L 12/28 (2006.01)

(52) U.S. Cl. ............ 370/235; 370/253; 370/252
(58) Field of Classification Search .......... 370/235, 370/389, 392, 232; 392/386, 69, 96, 125; 375/259; 348/143
See application file for complete search history.

(56) References Cited

U.S. PATENT DOCUMENTS 6,108,382 A    8/2000  Gringeri et al.

(Continued)

FOREIGN PATENT DOCUMENTS

CN    1476199 A    2/2004

(Continued)

OTHER PUBLICATIONS

Chih-Yen Lin, "An Adaptive Protection Framework for MPEG Base Layer Video Streaming Over Internet", Proceedings of the 2003 Joint Conference of the Fourth International Conference on Singapore Information, Communications and Signal Processing, Dec. 15-18, 2003, pp. 1365-1369.

(Continued)

*Primary Examiner*—Ricky Ngo
*Assistant Examiner*—David Oveissi
(74) *Attorney, Agent, or Firm*—Sughrue Mion, PLLC

(57) ABSTRACT

An apparatus and method for transmitting a multimedia data stream are provided. The apparatus includes a data source unit to output the data stream; a frame dividing unit to divide the data stream according to a type of a video frame included in the data stream and to output the divided data stream; a parameter control unit to select a parameter set for separate transmission control of the divided data stream using parameters for controlling a transmission layer; and a network interface unit to control transmission of the divided data stream using the parameter set. The method includes dividing the data stream according to a type of a video frame; selecting a parameter set for separate transmission control of the divided data stream; and controlling transmission of the divided data stream using the selected parameter set.

15 Claims, 9 Drawing Sheets

U.S. PATENT DOCUMENTS

| | | | |
|---|---|---|---|
| 6,222,841 B1* | 4/2001 | Taniguchi | 370/389 |
| 6,529,550 B2* | 3/2003 | Tahara et al. | 375/240 |
| 7,411,903 B2* | 8/2008 | Jang et al. | 370/230 |
| 2002/0004838 A1 | 1/2002 | Hakenberg et al. | |
| 2002/0010938 A1 | 1/2002 | Zhang et al. | |
| 2004/0213552 A1* | 10/2004 | Kato | 386/69 |
| 2005/0147175 A1* | 7/2005 | Nakamura | 375/259 |
| 2006/0044389 A1* | 3/2006 | Chai et al. | 348/143 |

FOREIGN PATENT DOCUMENTS

| | | |
|---|---|---|
| EP | 1 385 292 A2 | 1/2004 |
| KR | 10-2002-0057176 A | 7/2002 |
| KR | 10-2004-0009928 A | 1/2004 |

OTHER PUBLICATIONS

I. E. G. Richardson, et al., "MPEG Coding for Error-Resilient Transmission", International Conference on Image Processing and It'S Applications, 1995, pp. 559-563, No. 140.

K. Park, et al., "QoS-sensitive transport of real-time MPEG video using adaptive redundancy control", Computer Communications, 2001, pp. 78-92, vol. 24, No. 1.

Jill M. Boyce, "Packet loss resilient transmission of MPEG video over the Internet", Signal Processing: Image Communication, Sep. 1999, pp. 7-24, vol. 15, No. 1-2.

Yao Wang, et al., "Error Control and Concealment for Video Communication: A Review", Proceedings of the IEEE, May 1998, pp. 974-997, vol. 86, No. 5.

* cited by examiner

APPARATUS AND METHOD FOR TRANSMITTING A MULTIMEDIA DATA STREAM

CROSS-REFERENCE TO RELATED PATENT APPLICATION

This application claims priority from Korean Patent Application No. 10-2005-0037624, filed on May 4, 2005, in the Korean Intellectual Property Office, the disclosure of which is incorporated herein in its entirety by reference.

BACKGROUND OF THE INVENTION

1. Field of the Invention

The present invention relates to multimedia communication, and more particularly, to an apparatus and method for efficiently transmitting a multimedia data stream according to the state of a network and the type of a video frame.

2. Description of the Related Art

Streaming is a technology to process data to be transmitted so that data transmission can take place endlessly and continuously. Accordingly streaming has become increasingly important in line with the growth of the Internet, because most users do not have Internet connection lines fast enough to rapidly download voluminous multimedia files. When streaming is used, data can be presented by a client browser or plug-in even before full transmission of a file is completed.

For streaming over a wireless network, it is necessary to solve problems such as a variable bandwidth, a multi-path fading phenomenon, movement, handoff, traffic, partial data loss due to packetization of a video frame, and variety of client devices.

As an approach to solve the problems, a cross-layer optimization method has been suggested. The cross-layer optimization method is based on the exchange of layers' information between at least two protocol stacks.

A video stream consists of frames including picture information. Generally, the frames include various types of video information according to video compression methods. According to a moving picture expert group (MPEG) video compression method, an intra-coded (I) frame including information of the entire screen without reference to other frames, a bidirectional-coded (B) frame including information of a difference from a past frame and/or a future frame, and a predictive-coded (P) frame coded with reference to information of a past I or P frame are used. The I frame has a large size, and the B frame or P frame has a small size and is transmitted several times between transmission of the I frame. One I frame and a plurality of B frames and P frames following the I frame form a group of pictures (GOP).

The I frame can be positioned anywhere in a video stream, is used for a random data access, and is coded without reference to other frames. The P frame is coded or decoded using information of a past I frame and a past P frame. The B frame is coded or decoded using information of past and future I frames and past and future P frames. An I frame loss has an influence upon the other B frames and P frames in a GOP. A P frame loss has an influence only upon the B frames in a GOP. A B frame loss has no influence upon other types of frames.

Therefore, to maintain the quality of an audio/video (AV) service in a poor channel environment, the transmission success probability of an I frame should be improved when compared to a B frame or a P frame. However, the characteristic of an MPEG frame is not reflected in a conventional system where transmission control parameters are set statically. A conventional multimedia transmission system processes an I frame and other types of frames in the same manner when a transmission error occurs, resulting in degradation of a service quality.

SUMMARY OF THE INVENTION

The present invention provides an apparatus and method for transmitting a multimedia data stream, in which an optimal multimedia streaming service is provided based on the characteristic of a data frame used in an audio/video (AV) service.

The present invention also provides an apparatus and method for transmitting a multimedia data stream, in which a transmission parameter of a packet is set dynamically based on the current state of a channel while monitoring the state of a media access control (MAC) layer.

According to an aspect of the present invention, there is provided an apparatus for transmitting a multimedia data stream. The apparatus includes a data source unit which is configured to output the multimedia data stream; a frame dividing unit which is configured to divide the multimedia data stream according to a type of a video frame included in the multimedia data stream and to output the divided multimedia data stream; a parameter control unit which is configured to select a parameter set for separate transmission control of the divided multimedia data stream using parameters for controlling a transmission layer; and a network interface unit which is configured to control transmission of the divided multimedia data stream using the parameter set.

According to another aspect of the present invention, there is provided a method for transmitting a multimedia data stream. The method includes dividing the multimedia data stream according to a type of a video frame included in the multimedia data stream; selecting a parameter set for separate transmission control of the divided multimedia data stream using parameters for controlling a transmission layer; and controlling transmission of the divided multimedia data stream using the selected parameter set.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

Figure 1:
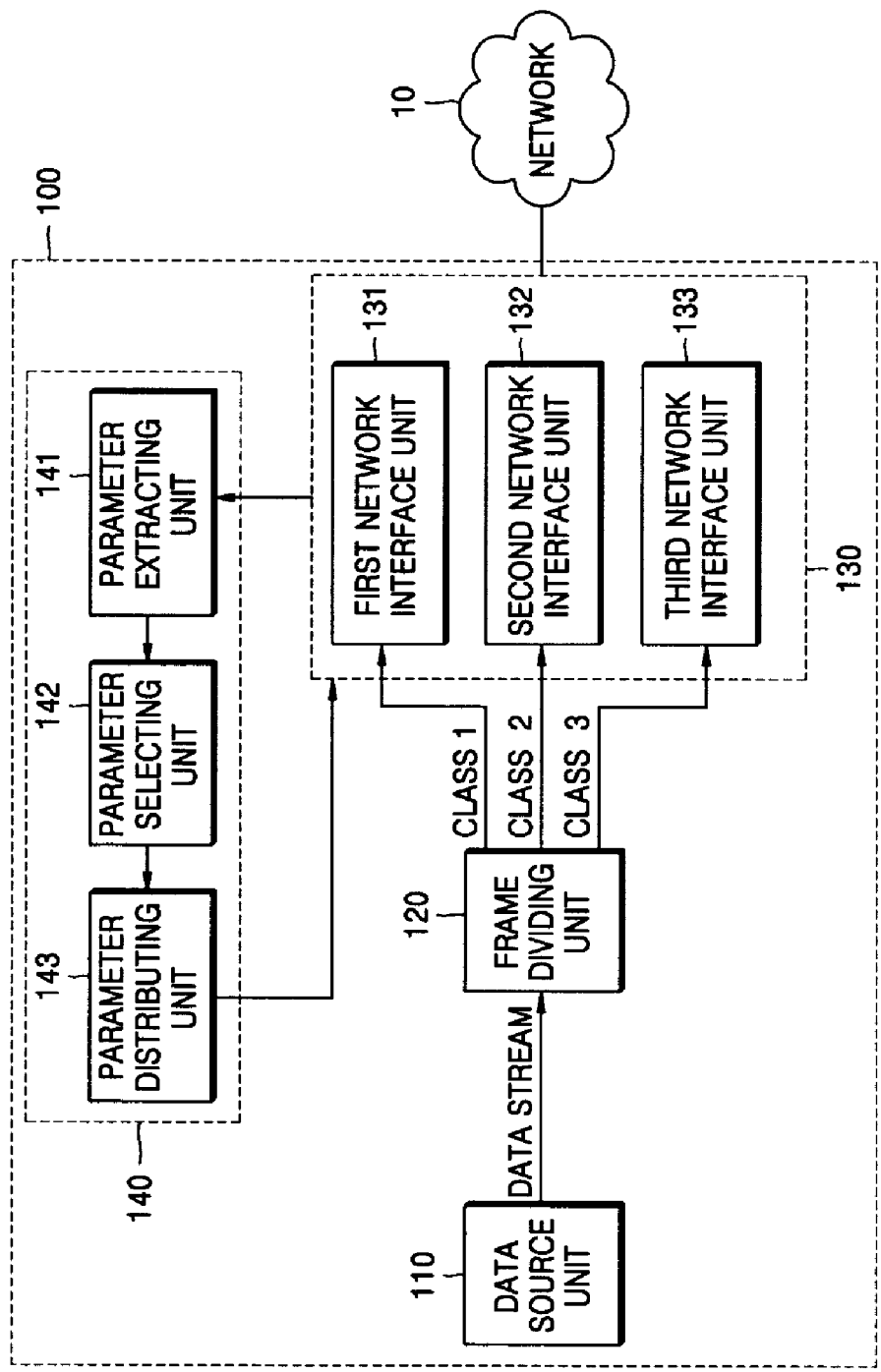
FIG. 1 is a block diagram of an apparatus for transmitting a multimedia data stream according to an exemplary embodiment of the present invention.

FIG. 1 is a block diagram of an apparatus 100 for transmitting a multimedia data stream according to an exemplary embodiment of the present invention.

The apparatus 100 divides video frames to be transmitted according to their type and sets separate parameters for the divided video frames in a media access control (MAC) layer used for transmission of the divided video frames, thereby controlling a transmitted video stream to have a quality higher than a level even when a channel error occurs. The level may be predetermined. More specifically, the apparatus 100 allows reliable transmission of high-priority video frames through differential video frame transmission where different priorities are assigned to video frames according to the characteristics of the video frames such that parameters for allowing stable transmission are assigned to the high-priority video frames and parameters for increasing the rate of resources used by the high-priority video frames in the same bandwidth are assigned to low-priority video frames. The apparatus 100 may operate as a server that provides a video stream to a plurality of clients.

Referring to FIG. 1, the apparatus 100 includes a data source unit 110, a frame dividing unit 120, a network interface unit 130, and a parameter control unit 140.

The data source unit 110 encodes multimedia data for multimedia streaming and outputs a data stream. Here, the data stream may be an MPEG program stream (PS) including a video stream and an audio stream. The PS is a standard made for a single program and is configured by multiplexing audio and video packetized elementary stream (PES) packets and loading program-related timing information in a header.

The frame dividing unit 120 generates one stream by combining a video stream and an audio stream included in a data stream provided by the data source unit 110, generates transport stream (TS) packets from the generated stream, divides the TS packets according to frame type, and outputs the divided TS packets to the network interface unit 130.

More specifically, after the frame dividing unit 120 configures a transport packet in units of a plurality of TS packets using a protocol used in a transport layer, it divides the transport packet according to frame type and outputs the divided transport packet to the network interface unit 130. The protocol may be predetermined. For example, when 7 TS packets are included in one user datagram protocol (UDP) packet, the UDP packet including at least one TS packet indicating an I frame is classified into a class 1 having the highest priority. The UDP packet including at least one TS packet indicating a P frame without a TS packet indicating an I frame is classified into a class 2 having the next-highest priority. The UDP packet including only a TS packet indicating a B frame is classified into a class 3 having the lowest priority.

The network interface unit 130 provides parameters indicating a current transmission state to the parameter control unit 140 and controls transmission of TS packets divided according to frame type based on a parameter set selected by the parameter control unit 140. The parameters may be parameters used for transmission control in IEEE 802.11a/b/g such as the number of packet retransmission, a transmission power, a forward error correction (FEC) rate, maximum allowable buffer wait time information of a packet, a transmission delay jitter between packets or other such transmission control parameter known in the art. For example, upon receipt of a packet retransmission request from a client due to a packet loss, the network interface unit 130 performs retransmission as many times as the number of packet retransmissions included in a parameter set selected by the parameter control unit 140, thereby performing differential data transmission control using the parameter.

In FIG. 1, the network interface unit 130 includes a plurality of network interface units, i.e., a first network interface unit 131, a second network interface unit 132, and a third network interface unit 133, to independently transmit the TS packets classified into the classes 1 through 3 according to frame type. In this case, separate parameter sets selected by the parameter control unit 140 are provided to the first network interface unit 131, the second network interface unit 132, and the third network interface unit 133. The first network interface unit 131, the second network interface unit 132, and the third network interface unit 133 control transmission of TS packets based on parameters provided by the parameter sets, thereby allowing differential transmission of TS packets divided according to frame type.

Instead of including a plurality of network interface units, the network interface unit 130 may include a single network card to differentially transmit TS packets divided according to frame type using a scheduling technique. The scheduling technique may be predetermined.

The parameter control unit 140 receives parameters indicating the current state of a network from the network interface unit 130, selects a parameter set according to a function and a frame type indicated by a TS packet to be transmitted, and provides the selected parameter set to the network interface unit 130. The function may be predetermined.

More specifically, the parameter control unit 140 includes a parameter extracting unit 141, a parameter selecting unit 142, and a parameter distributing unit 143.

The parameter extracting unit 141 receives parameters provided from the network interface unit 130, extracts a parameter element required for a quality of service (QoS) higher than a level (the level may be predetermined), presents the extracted parameters numerically, and outputs parameter sets that are combinations of all possible values of parameters.

The parameter selecting unit 142 selects a parameter set that can provide a QoS higher than a certain level (the certain level may be predetermined) based on a function and priority information classified according to frame type. The function may be predetermined.

The parameter distributing unit 143 provides the selected parameter set to the network interface unit 130, and the network interface unit 130 controls transmission of a TS packet according to parameters of the selected parameter set, thereby performing differential transmission according to frame type.

A process of selecting a parameter set in the parameter control unit 140 will be described in detail later.

Figure 2:
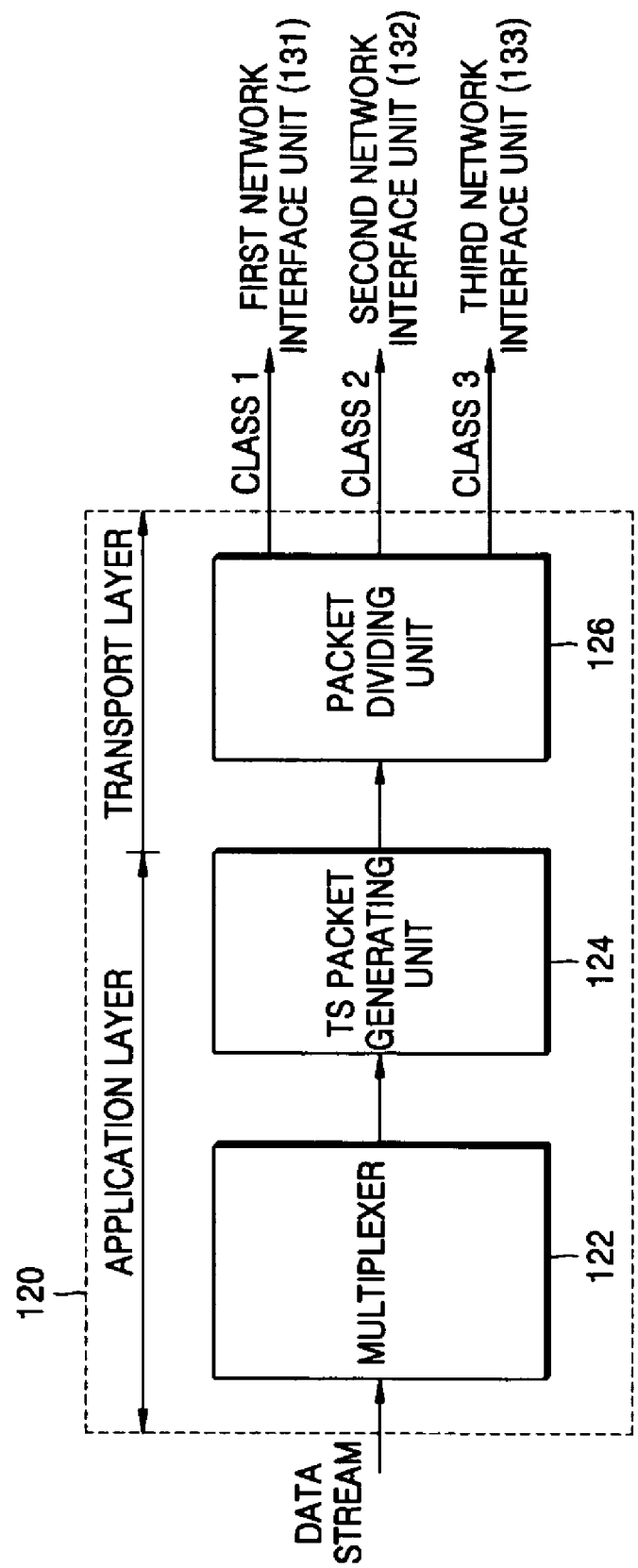
FIG. 2 is a block diagram of a frame dividing unit of FIG. 1.

FIG. 2 is a block diagram of the frame dividing unit 120 of FIG. 1.

Referring to FIG. 2, the frame dividing unit 120 includes a multiplexer 122, a TS packet generating unit 124, and a packet dividing unit 126.

The multiplexer 122 generates one stream by combining a video stream and an audio stream included in a data stream provided by the data source unit 110.

The TS packet generating unit 124 segments the stream into MPEG TS packets. The TS is a standard where a video, an audio, data are simultaneously transmitted as a single stream in an MPEG system. The TS includes at least one program and program information forming the entire stream, program time information, and control information for controlling the entire system are included in its header. A retry bit is set in the header of the TS to retransmit a packet having an error.

For the TS, PES packets are segmented into TS packets of 188 bytes. The TS packets obtained from audio and video PES packets can be identified by packet identifiers (PID) included in headers of the TS packets.

The packet dividing unit 126 classifies the TS packets into one of the classes 1 through 3 according to frame type and outputs the classified TS packets to the first network interface unit 131, the second network interface unit 132, and the third network interface unit 133 respectively. In other words, a TS packet corresponding to an I frame is classified into the class 1 having the highest priority and is output to the first network interface unit 131, a TS packet corresponding to a P frame is classified into the class 2 having the next-highest priority and is output to the second network interface unit 132, and a TS packet corresponding to a B frame is classified into the class 3 having the lowest priority and is output to the third network interface unit 133.

The multiplexer 122 and the TS packet generating unit 124 correspond to an application layer and the packet dividing unit 126 corresponds to a transport layer.

Figure 3:
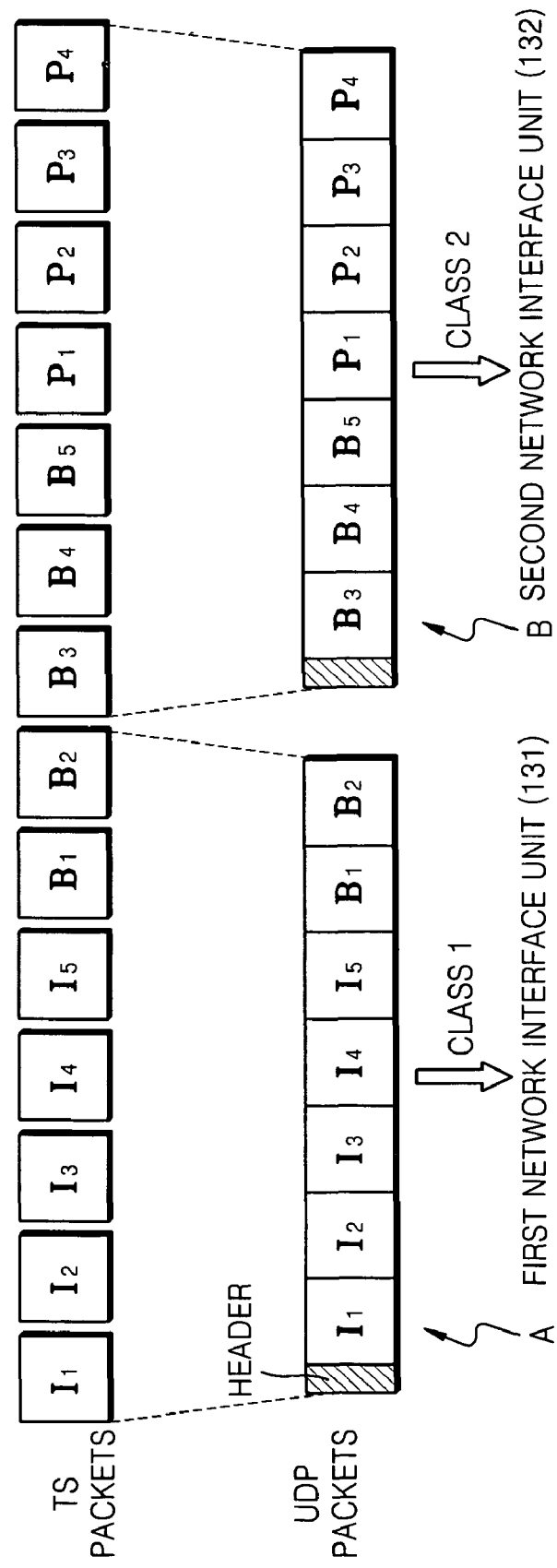
FIG. 3 is a view for explaining a process of dividing transport stream (TS) packets according to frame type in a packet dividing unit of FIG. 2.

FIG. 3 is a view for explaining a process of dividing TS packets according to frame type in the packet dividing unit 126 of FIG. 2.

Referring to FIG. 3, each frame of a video stream includes continuous TS packets. To transmit TS packets over a network, the packet dividing unit 126 corresponding to a transport layer groups a plurality of TS packets and then transmits the grouped TS packets through the network interface unit 130. FIG. 3 shows a process of dividing the plurality of TS packets into a UDP packet including 7 TS packets according to the frame type of each TS packet using a UDP used in the transport layer. The UDP packet may include TS packets corresponding to a plurality of frame types.

A UDP packet A includes TS packets I1 through I5 corresponding to an I frame and TS packets $B_1$ and $B_2$ corresponding to a B frame. The transmission success probability of an I frame should be increased to maintain the quality of an AV service. Thus, when the UDP packet includes the TS packets $I_1$ through $I_5$ corresponding to an I frame, the UDP packet is classified into the class 1 having the highest priority and is then transmitted to the first network interface unit 131. In other words, a UDP packet including at least one TS packet corresponding to an I frame is classified into the class 1.

A UDP packet B includes TS packets $B_3$ through $B_5$ corresponding to a B frame and TS packets $P_1$ through $P_4$ corresponding to a P frame. In this case, since the UDP packet B does not include a TS packet corresponding to an I frame, but includes the TS packets $P_1$ through $P_4$ corresponding to a P frame that is of a level of importance just below that of an I frame, the UDP packet is classified into the class 2 having the next highest priority and is then transmitted to the second network interface unit 132. In other words, a UDP packet including at least one TS packet corresponding to a P frame without a TS packet corresponding to an I frame is classified into the class 2.

Although not shown in FIG. 3, a UDP packet including only a TS packet corresponding to a B frame is classified into the class 3 having the lowest priority and is then transmitted to the third network interface unit 133.

Figure 4:
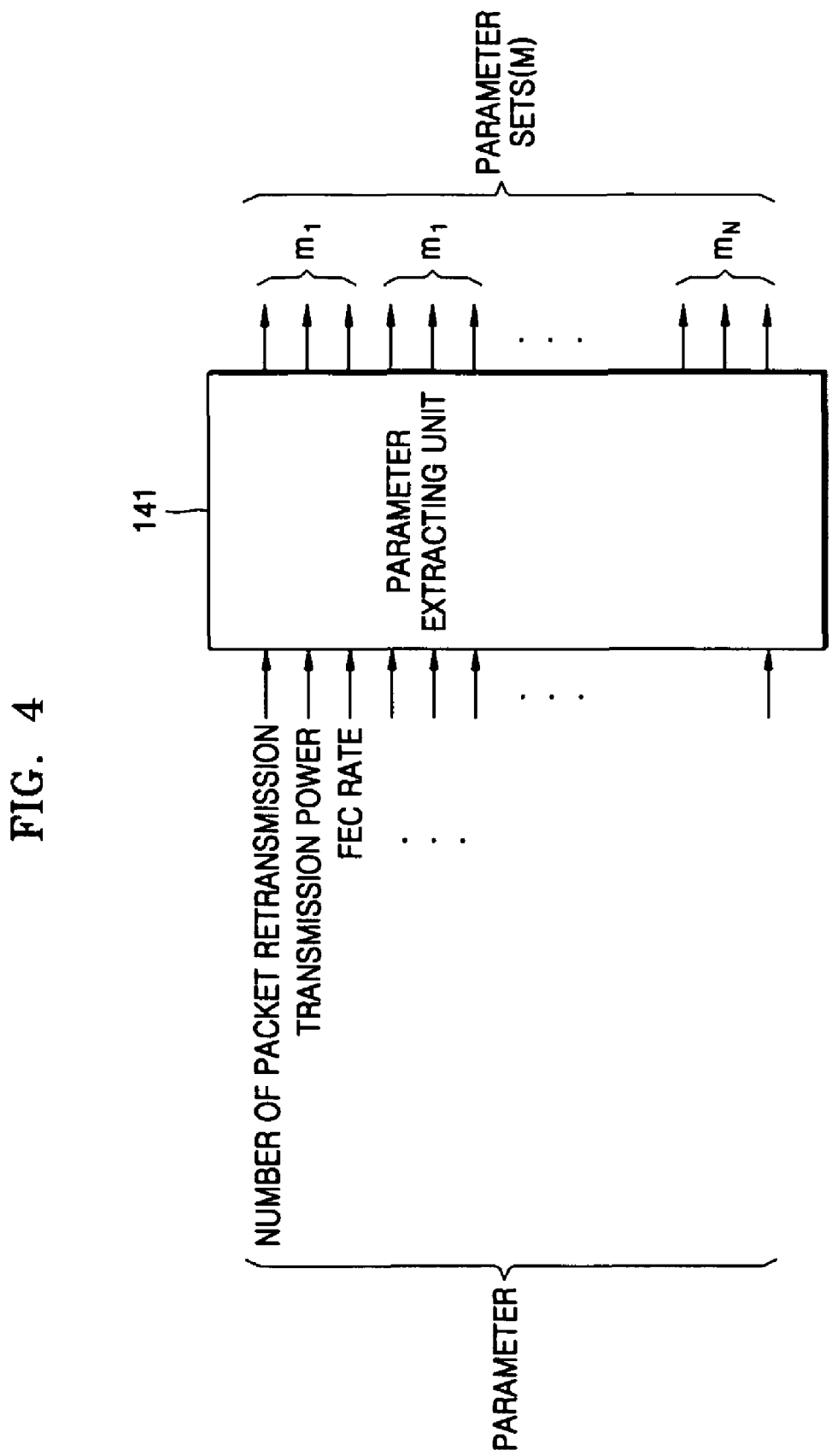
FIG. 4 is a view for explaining the operation of a parameter extracting unit of FIG. 1.

FIG. 4 is a view for explaining the operation of the parameter extracting unit 141 of FIG. 1.

The parameter extracting unit 141 is provided with parameters from the network interface unit 130, presents the parameters numerically for parameter selection, and outputs parameter sets that are combinations of all possible values of parameters.

Referring to FIG. 4, the parameters provided by the network interface unit 130 may include the number of packet retransmissions, a transmission power, a forward error correction (FEC) rate, maximum allowable buffer wait time information of a packet, a transmission delay jitter between packets, or other such network parameter known in the art. As mentioned above, the parameters may be, but are not limited to, parameters used for transmission control in IEEE 802.11a/b/g.

The parameter extracting unit 141 selects at least one parameter from the parameters, combines all possible values of the selected parameter, and outputs a parameter set group M. For example, as shown in FIG. 4, the number of packet retransmission, a transmission power, and a FEC rate are selected from the parameters provided by the network interface unit 130, all possible values of the selected parameters are combined, and parameter sets m1 through $m_N$ are output. In this case, if $m_i$={the number of packet retransmission, a transmission power, a FEC rate}, the parameter extracting unit 141 outputs a parameter set group M including parameters having different values such as $m_1$={5, 0.5, ½}, $m_2$={4, 0.4, ⅓}, and the like.

In addition, as shown in FIG. 1, when the network interface unit 130 includes a plurality of network interface units, the parameters sets $m_1$ through $m_N$ may include parameters for controlling packet transmission for each of the plurality of network interface units. For example, when the number of packet retransmission is k, a transmission power is Tx, and a FEC rate is R, the parameter set is configured as $m_1$={($k_1$, $Tx_1$, $R_1$), ($k_2$, $Tx_2$, $R_2$), ($k_3$, $Tx_3$, $R_3$)} so that ($k_i$, $Tx_i$, $R_i$) can serve as a parameter for controlling an $i^{th}$ network interface unit.

Figure 5:
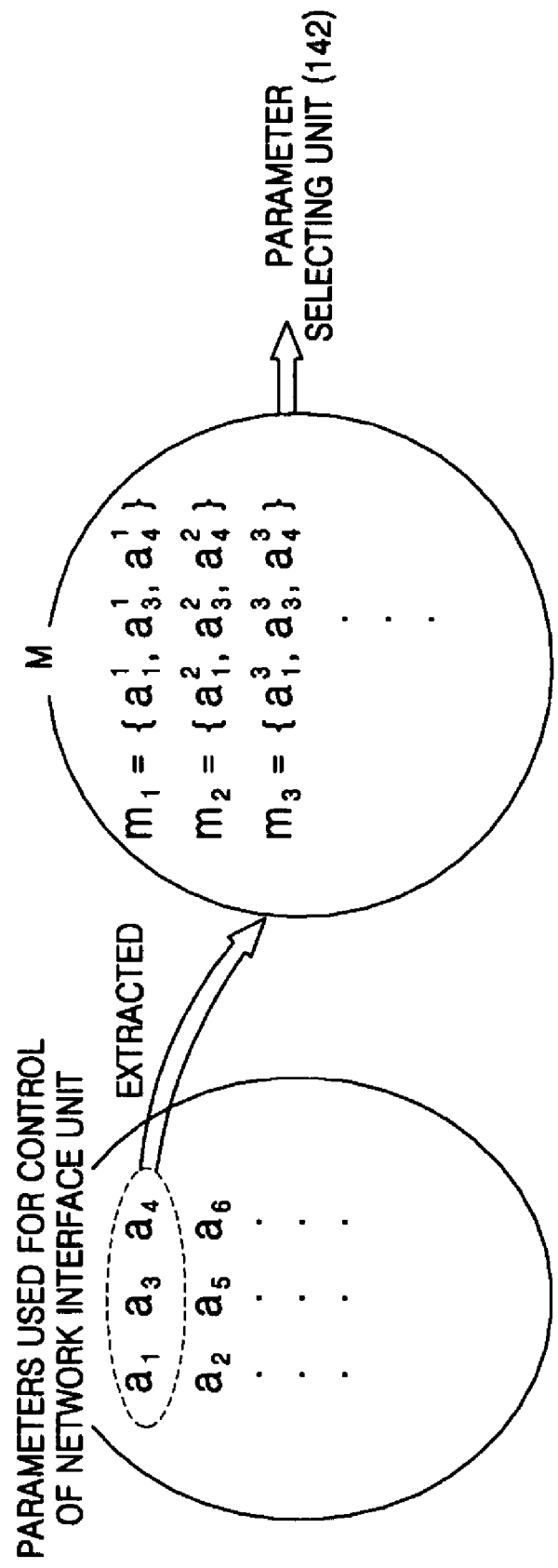
FIG. 5 is another view for explaining the operation of the parameter extracting unit of FIG. 1.

FIG. 5 is another view for explaining the operation of the parameter extracting unit 141 of FIG. 1. Referring to FIG. 5, the parameter extracting unit 141 receives parameters A used for controlling the network interface unit 130 and extracts a parameter having an influence upon multimedia transmission from the parameters A. As shown in FIG. 5, if $a_1$, $a_3$, and a4 are extracted from various parameters {$a_1$, $a_2$, ... } provided by the network interface unit 130, the parameter extracting unit 141 combines all possible values of the extracted parameters $a_1$, $a_3$, and $a_4$ to configure various parameter sets $m_i$ and outputs a parameter set group M to the parameter selecting unit 142.

Figure 6:
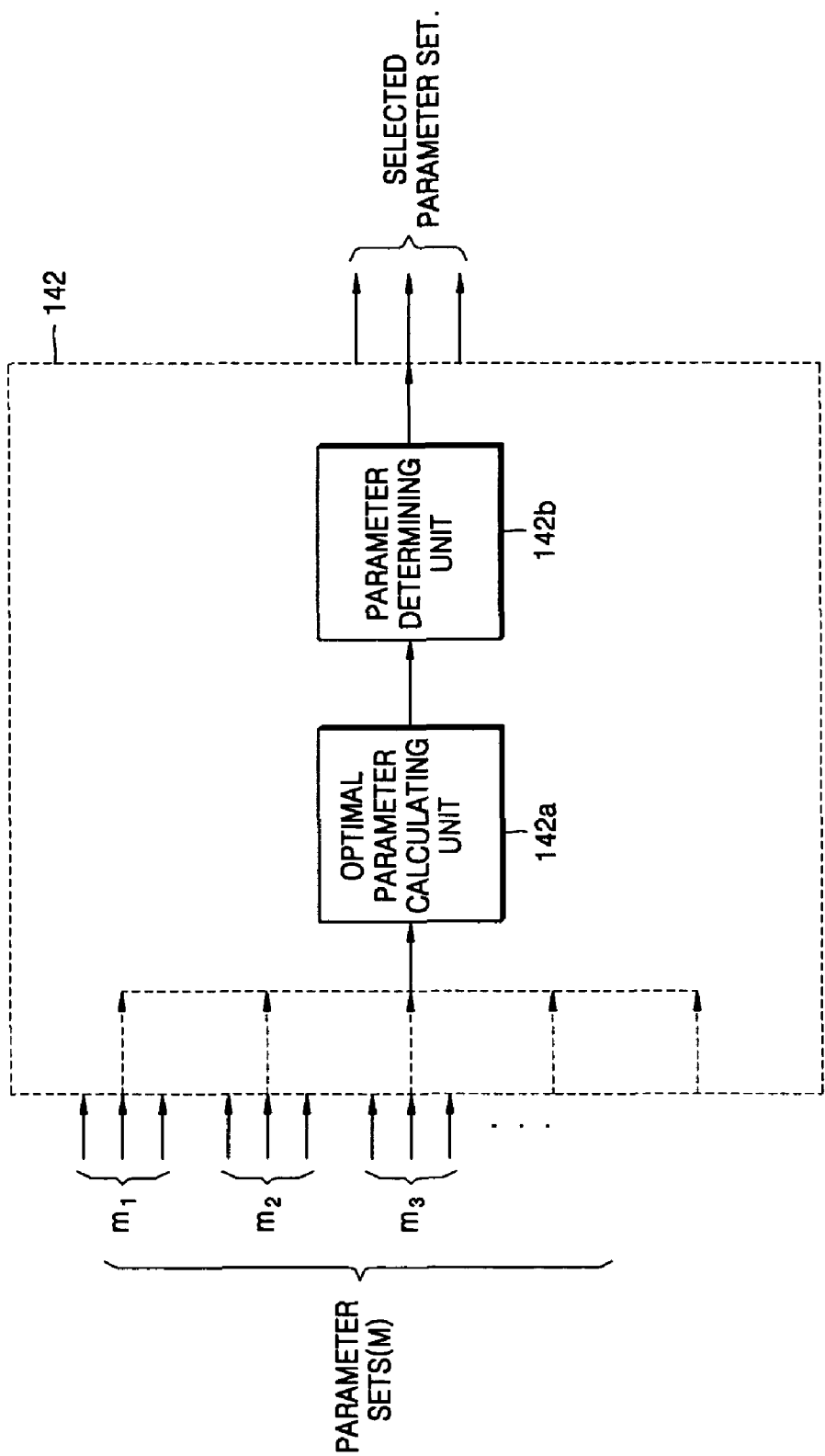
FIG. 6 is a view for explaining the configuration and operation of a parameter selecting unit of FIG. 1.

FIG. 6 is a view for explaining the configuration and operation of the parameter selecting unit 142 of FIG. 1.

Referring to FIG. 6, the parameter selecting unit 142 includes an optimal parameter calculating unit 142a and a parameter determining unit 142b.

The optimal parameter calculating unit 142a substitutes a parameter set $m_i$ from the parameter set group M provided by the parameter extracting unit 141 for a function and calculates the value of the function. The function may be predetermined. For example, a case where the number of packet retransmission k is selected as a parameter will be described as follows. When $k_1$, $k_2$, and $k_3$ indicate the numbers of packet retransmission of the first network interface unit 131, the second network interface unit 132, and the third network interface unit 133 respectively, $N_1$, $N_2$, and $N_3$ indicate the numbers of frames transmitted per GOP through the first network interface unit 131, the second network interface unit 132, and the third network interface unit 133 respectively, and $L_1$, $L_2$, and $L_3$ indicate the lengths of packet sequences per frame respectively, the amount of consumption of a network bandwidth in transmission of the TS packets through the network interface unit 130 can be calculated as follows.

$$\Omega(\hat{H})=N_1 \cdot k_1 \cdot L_1 + N_2 \cdot k_2 \cdot L_2 + N_3 \cdot k_3 \cdot L_3 \qquad (1)$$

By using a function such as Equation 1, the amount of consumption of a network resource such as a bandwidth can be calculated.

Next, the parameter determining unit 142b selects a parameter set that is most suitable for a current QoS requirement using the calculated value of the function. In the above example, the parameter determining unit 142b compares the amounts of consumption of a network resource calculated using Equation 1 and determines a parameter set that minimizes the amount of consumption of a network resource among parameter sets.

The parameter determining unit 142b selects a parameter set that satisfies the current QoS requirement among the parameter sets based on the value of the function calculated by the optimal parameter calculating unit 142a and a current frame type, i.e., a priority, and outputs the selected parameter set to the network interface unit 130. When a network resource is insufficient, the parameter determining unit 142b may determine an appropriate parameter set by dropping transmission of a B frame having the lowest priority among the divided frames so that the network resource can be used for transmission of an I frame or a P frame having a high priority.

The parameter set selected by the parameter determining unit 142b is provided to the network interface unit 130 through the parameter distributing unit 143 to allow the network interface unit 130 to control transmission of TS packets using the selected parameter set.

Figure 7:
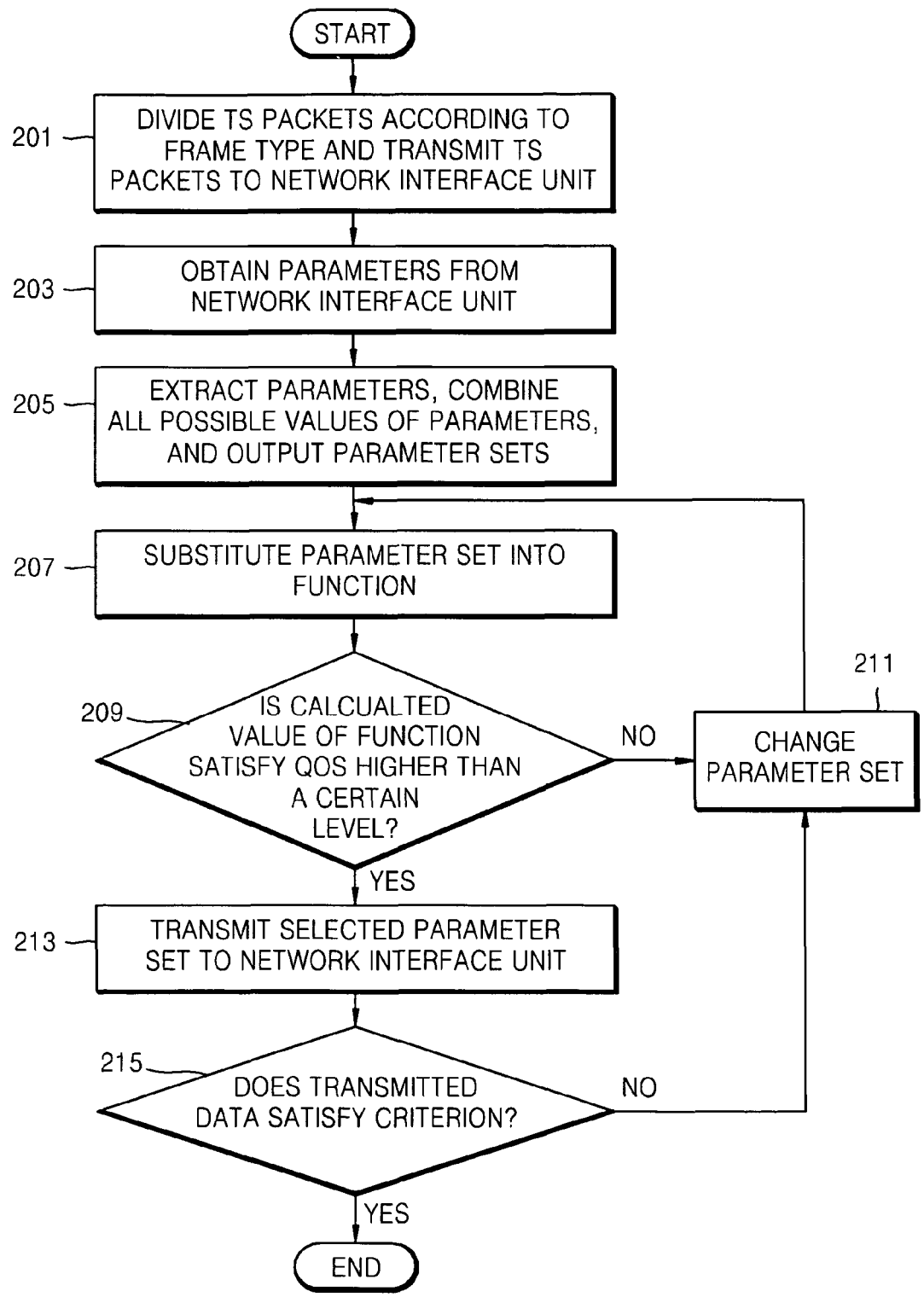
FIG. 7 is a flowchart illustrating a method for transmitting a multimedia data stream according to an exemplary embodiment of the present invention.

FIG. 7 is a flowchart illustrating a method for transmitting a multimedia data stream according to an exemplary embodiment of the present invention.

Referring to FIG. 7, in operation 201, multimedia data to be transmitted, i.e., TS packets, are divided according to a frame type and transmitted to the network interface unit 130 corresponding to an MAC layer.

In operation 203, the parameter control unit 140 is provided with parameters used for the transmission of the multimedia data from the network interface unit 130. As mentioned above, the parameters may be parameters used for transmission control in IEEE 802.11a/b/g.

In operation 205, the parameter extracting unit 141 extracts parameters to be controlled from the provided parameters, combines all possible values of the extracted parameters, and outputs a parameter set.

In operation 207, the optimal parameter calculating unit 142a of the parameter selecting unit 142 substitutes the parameter set into a function for calculating the amount of consumption of a network resource and calculates the value of the function. The function may be predetermined.

In operation 209, the parameter determining unit 142b determines whether the selected parameter set satisfies a QoS higher than a certain level using the calculated value of the function. The level may be predetermined. When a network resource is insufficient, the parameter determining unit 142b may determine an appropriate parameter set by dropping transmission of a B frame having the lowest priority among the divided frames so that the network resource can be used for transmission of an I frame or a P frame having a high priority.

In operation 211, if the selected parameter set does not satisfy the QoS higher than the certain level, the value of the function is calculated using another parameter set and it is determined whether the newly selected parameter set satisfies the QoS higher than the certain level.

In operation 213, if the selected parameter set satisfies the QoS higher than the certain level, the parameter distributing unit 143 transmits the selected parameter set to the network interface unit 130.

In operation 215, the network interface unit 130 determines whether the transmitted data satisfies a certain criterion. The criterion may be predetermined. If the transmitted data does not satisfy the certain criterion, the selected parameter set is changed into a new one and operations following operation 207 are repeated. Here, determination of whether to satisfy the certain criterion may be performed by measuring the quality of the transmitted data using metric such as peak signal-to-noise ratio (PSNR).

Once parameters are selected through the above operations, the network interface unit 130 controls transmission of the TS packets using the selected parameters.

Figure 8:
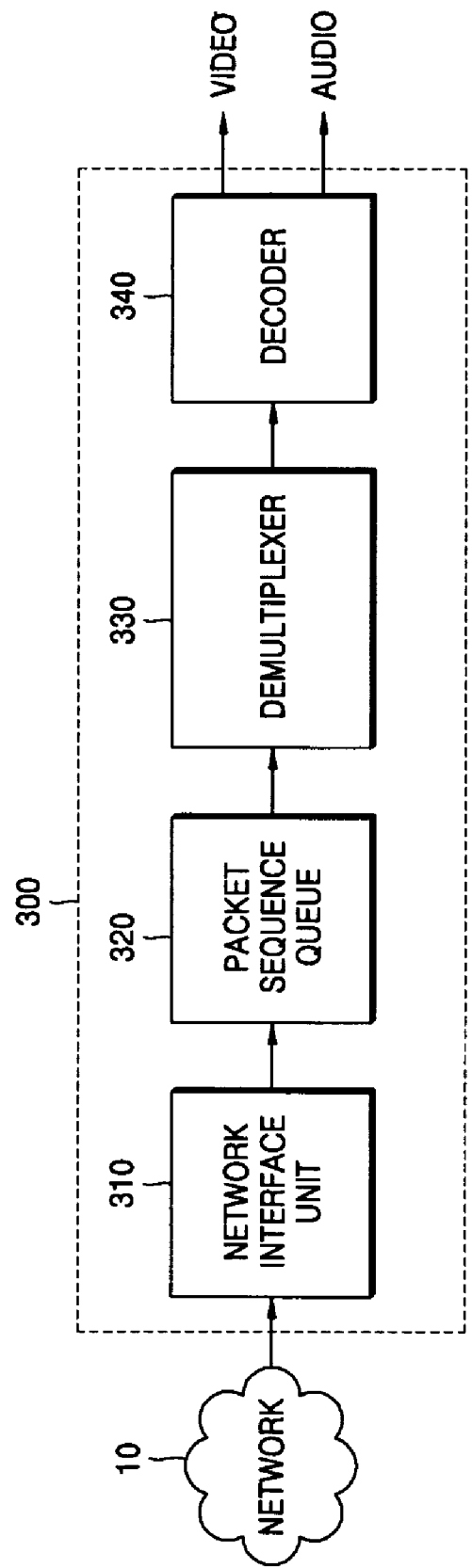
FIG. 8 is a block diagram of an apparatus for receiving a multimedia data stream according to an exemplary embodiment of the present invention.

FIG. 8 is a block diagram of an apparatus 300 for receiving a multimedia data stream according to an exemplary embodiment of the present invention.

Referring to FIG. 8, the apparatus 300 includes a network interface unit 310, a packet sequence queue 320, a demultiplexer 330, and a decoder 340.

The network interface unit 310 is a MAC layer receiving packet data provided from the apparatus 100 for transmitting a multimedia data stream. A network card that is the same as that used for the network interface unit 130 of the apparatus 100 may be used as the network interface unit 310.

The packet sequence queue 320 arranges packet data received through different paths.

The demultiplexer 330 divides video and audio streams from the packet data arranged by the packet sequence queue 320, and the divided video and audio streams are reproduced and output by the decoder 340.

Figure 9:
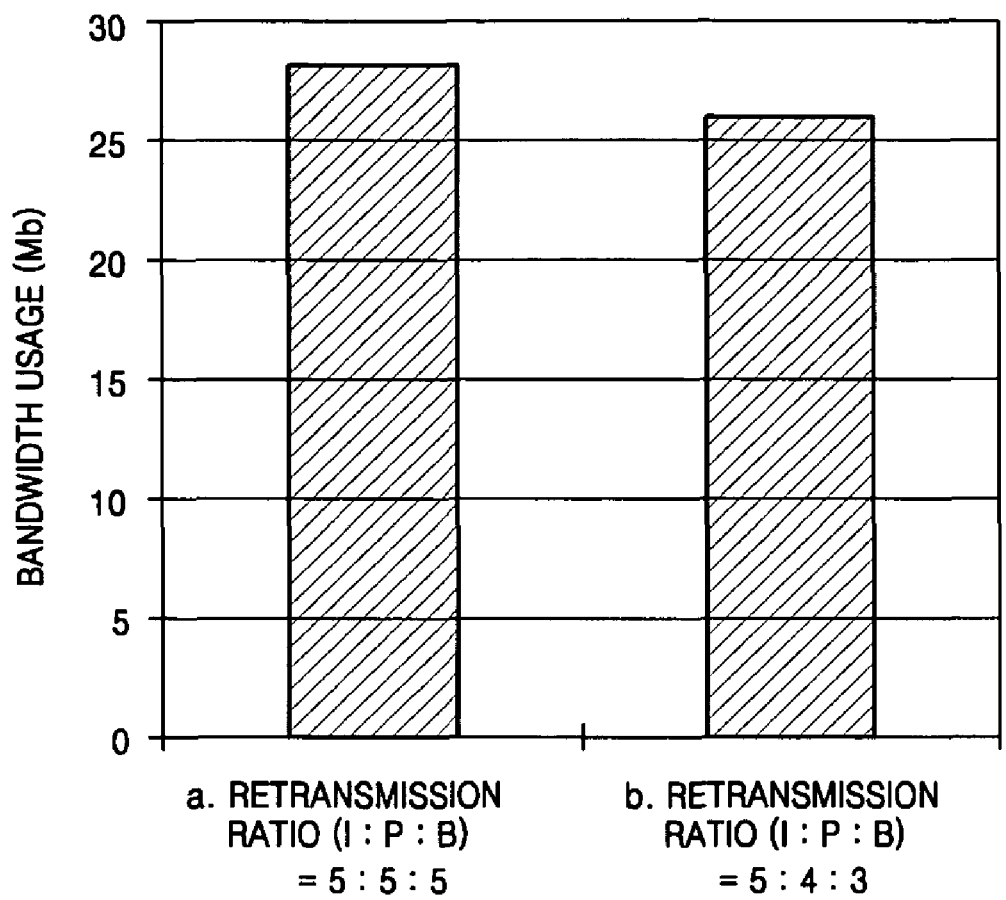
FIG. 9 is a graph illustrating the total amount of bandwidth used when a predetermined video clip is transmitted by an apparatus and method for transmitting a multimedia data stream according to an exemplary embodiment of the present invention.

FIG. 9 is a graph illustrating the total amount of bandwidth used when a video clip (which may be predetermined) is transmitted by an apparatus and method for transmitting a multimedia data stream according to an exemplary embodiment of the present invention.

In a similation of the present invention, three ORiNOCO 8482 PCI WLAN cards are used as the network interface unit 130 and each WLAN card transmits I, B, and P frames divided by the frame dividing unit 120. The WLAN cards comply with 802.11a. A video clip transmitted has an average data rate of 1.2 Mbps and complies with MPEG-1. Each GOP includes 24 frames.

First, when the number of packet retransmissions of each of I, P, and B frames is set to 5, the amount of bandwidth used is 28 Mbytes as indicated by (a) of FIG. 9. On the other hand, when the numbers of packet transmission of I, P, and B frames are set to 5, 4, and 3, respectively, the amount of bandwidth used is about 26 Mbytes as indicated by (b) of FIG. 9. Thus, it can be seen that the amount of consumption of a bandwidth in (b) is reduced by about 7.8% when compared to (a) where the number of packet transmission of each of I, P, and B frames is set to the same number.

As described above, according to exemplary embodiments of the present invention, it is possible to efficiently use a network resource by reducing a bandwidth used in data transmission.

Although the above description is focused on a case where the number of packet retransmissions is used as a parameter controlled by the network interface unit 130, parameters used for transmission in another MAC layer such as a transmission power or a FEC rate may be appropriately selected and be used to control transmission of multimedia data.

The apparatus and method for transmitting a multimedia data stream can be applied to any field using streaming techniques such as a video on demand (VOD) service, a music on demand (MOD) service, an audio on demand (AOD) service, an Internet phone, or other streaming technique known in the art.

As described above, according to exemplary embodiments of the present invention, the amount of consumption of a network resource in multimedia data communication in a wireless manner can be efficiently reduced by controlling parameters of a MAC layer based on the characteristic of a video frame.

Moreover, apparatuses and methods consistent with the present invention can be applied to control parameters of a MAC layer based on the characteristic of data to be transmitted in various multimedia data communication devices.

Furthermore, according to exemplary embodiments of the present invention, frames are divided and parameters of an MAC layer are set according to frame type, thereby maintaining the transmission error probability of an I frame at a lower level than other types of frames and thus improving the entire service quality.

The present invention can also be embodied as a computer-readable code on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, optical data storage devices, and carrier waves. The computer-readable recording medium can also be distributed over network coupled computer systems so that the computer-readable code is stored and executed in a distributed fashion.

While the present invention has been particularly shown and described with reference to an exemplary embodiment thereof, it will be understood by those of ordinary skill in the art that various changes in form and details may be made therein without departing from the spirit and scope of the present invention as defined by the following claims.

What is claimed is:

1. An apparatus for transmitting a multimedia data stream, the apparatus comprising:
   a data source unit which is configured to output the multimedia data stream;
   a frame dividing unit which is configured to divide the multimedia data stream into a plurality of groups of transport stream (TS) packets, included in the multimedia data stream and to output the divided multimedia data stream;
   a parameter control unit which is configured to select a parameter set of a plurality of parameter sets for each of the groups of the TS packets based on a priority of each group for separate transmission control of the groups of TS packets using a plurality of parameters of the selected parameter set for controlling a transmission layer; and
   a network interface unit which is configured to control transmission of the groups of TS packets separately using the selected parameter set,
   wherein the frame dividing unit determines the priority of each group of TS packets by classifying each group of TS packets into a highest priority class if at least one I frame is present in the group of TS packets, into a next-highest priority class if at least one P frame but no I frames are present in the group of TS packets, and into a lowest priority class if only B frames are present in the group of TS packets.

2. The apparatus of claim 1, wherein the frame dividing unit comprises:
   a multiplexer which is configured to combine a video stream and an audio stream included in the multimedia data stream to generate an output stream;
   a transport stream (TS) packet generating unit which is configured to segment the output stream into a plurality of TS packets; and
   a packet dividing unit which is configured to divide the plurality of TS packets according to frame type and to output the divided TS packets.

3. The apparatus of claim 2, wherein the packet dividing unit groups the plurality of TS packets using a transport layer protocol and outputs the grouped TS packets.

4. The apparatus of claim 3, wherein the transport layer protocol is a user datagram protocol (UDP).

5. The apparatus of claim 1, wherein the parameter control unit comprises:
   a parameter extracting unit which is configured to receive the plurality of parameters for controlling the transmission layer from the network interface unit, to present the received plurality of parameters numerically, and to output at least one parameter set that includes combinations of all possible values of the received plurality of parameters;
   a parameter selecting unit which is configured to select the parameter set for separate transmission of the divided multimedia data stream from among the at least one parameter set; and
   a parameter distributing unit which is configured to provide the parameter set selected by the parameter selecting unit to the network interface unit.

6. The apparatus of claim 5, wherein the parameter selecting unit comprises:
   an optimal parameter calculating unit which is configured to substitute the selected parameter set into a function and to calculate the value of the function; and
   a parameter determining unit which is configured to select a parameter set suitable for a current service quality requirement using the calculated value of the function.

7. The apparatus of claim 6, wherein the function is used for calculating the amount of consumption of a network resource in transmission of the multimedia data stream.

8. The apparatus of claim 6, wherein the parameter determining unit determines a parameter set among the plurality of parameter sets provided from the parameter extracting unit that minimizes the amount of consumption of a network resource.

9. The apparatus of claim 1, wherein the network interface unit is configured with at least one network interface card for separate transmission control of the divided multimedia data stream.

10. The apparatus of claim 1, wherein the parameters are parameters used for transmission control in one of IEEE 802.11 a/b/g.

11. A method for transmitting a multimedia data stream, the method comprising:
   outputting, by a data source unit, the multimedia data stream;
   dividing, by a frame dividing unit, the multimedia data stream into a plurality of groups of transport stream (TS) packets included in the multimedia data stream;
   selecting, by a parameter selection unit, a parameter set of a plurality of parameter sets for each of the groups of the TS packets based on a priority of each group for separate transmission control of the divided multimedia data stream using a plurality of parameters of the selected parameter set for controlling a transmission layer; and controlling, by a network interface unit, transmission of the groups of TS packets separately using the selected parameter set using the selected parameter set, wherein the priority of each group of TS packets is determined by classifying each group of TS packets into a highest priority class if at least one I frame is present in the group of TS packets, into a next-highest priority class if at least one P frame but no I frames are present in the group of TS packets, and into a lowest priority class if only B frames are present in the group of TS packets.

12. The method of claim 11, wherein the plurality of parameters are parameters used for transmission control in one of IEEE 802.11 a/b/g.

13. The method of claim 11, wherein the selecting of the parameter set comprises selecting the parameter set that minimizes an amount of consumption of a network resource using a function for calculating the amount of consumption of a network resource.

14. The method of claim 11, wherein the controlling of the transmission of the divided multimedia data stream comprises selectively dropping data having a low priority among the divided multimedia data stream when a network resource is insufficient.

15. The apparatus of claim 1, wherein the packet comprises a plurality of types of video frames.

* * * * *